Figure 1:
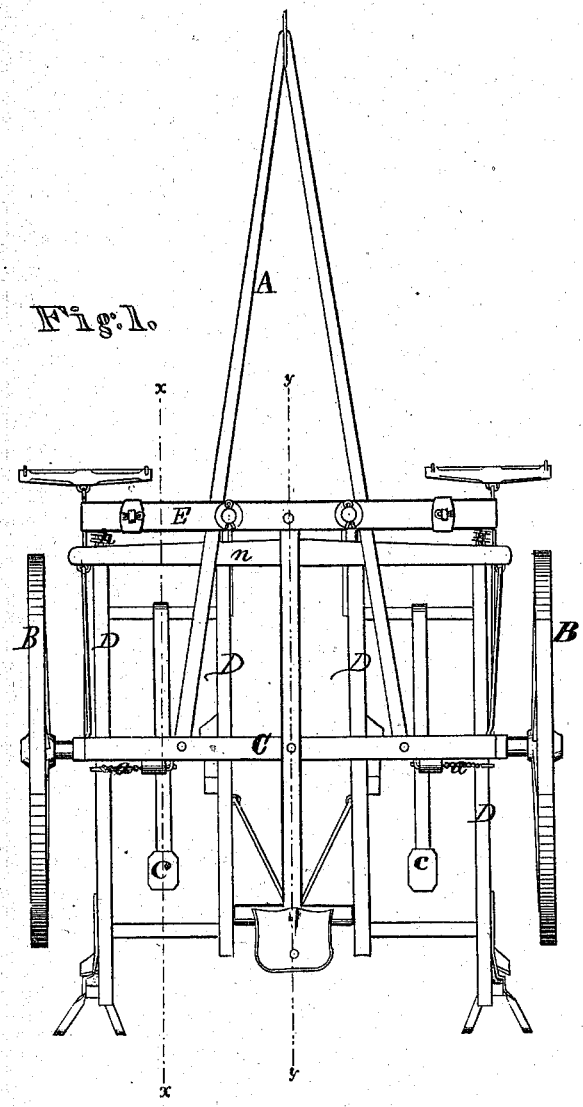

2 Sheets—Sheet 1.

R. B. ROBBINS.
SULKY CULTIVATOR.

No. 112,496. Patented Mar. 7, 1871.

Witnesses.
Chas. Kenyon.
Villette Anderson

Inventor.
R. B. Robbins
Chipman, Hosmer & Co.
Attys.

R. B. ROBBINS.
SULKY CULTIVATOR.
No. 112,496.   Patented Mar. 7, 1871.
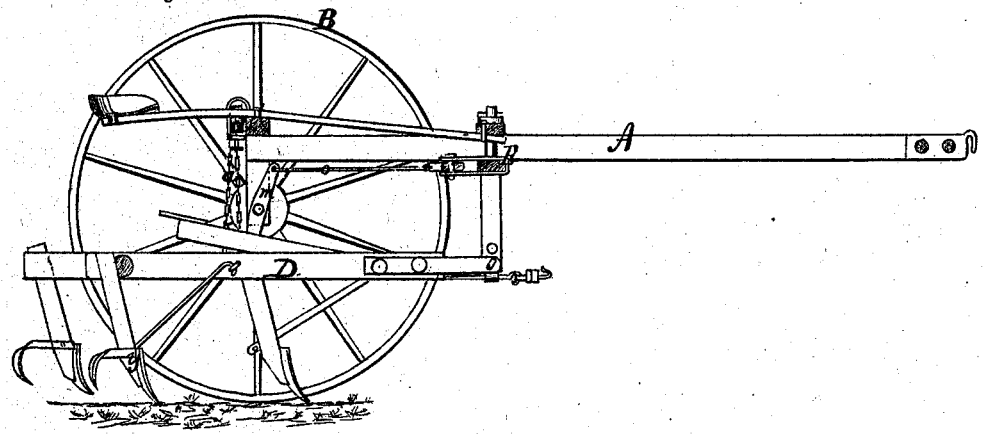
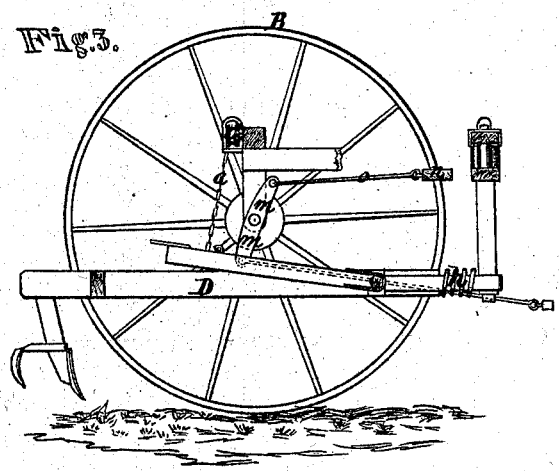
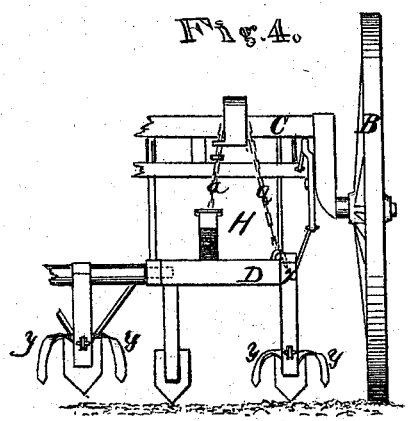

UNITED STATES PATENT OFFICE.

RICHARD B. ROBBINS, OF ADRIAN, MICHIGAN.

IMPROVEMENT IN SULKY-CULTIVATORS.

Specification forming part of Letters Patent No. 112,496, dated March 7, 1871.

*To all whom it may concern:*

Be it known that I, RICHARD B. ROBBINS, of Adrian, in the county of Lenawee and State of Michigan, have invented a new and valuable Improvement in Sulky-Cultivators; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my cultivator. Fig. 2 is a central vertical section through the line $y\ y$. Fig. 3 is a vertical section through the line $x\ x$. Fig. 4 is a partial rear view, showing the supplemental part H.

My invention relates to means for cultivating corn and other plants; and it consists in improvements upon the common cultivator, which are hereinafter particularly described.

A of the drawings represents the neap, B the wheels, and C the axle, of a sulky for that class of cultivators called "straddle-row."

D D represent swinging frames, to which the plows are attached, and which are respectively pivoted to pendent arms from cross-bars E, as shown on the drawings. They are also attached to the axle by means of the chains $a$, which are connected with the outer rails of the frame and the treadles $c$, and are passed over the pulleys $d$, as represented.

The letter $h$ represents a coiled spring arranged upon the metallic shank, by which the outer rail of a swinging frame is united with the pendent arms of the cross-bar, and operates between said arm and the front end of said rail proper. It will be observed that the metallic shank of this side rail is passed around said pendent arm in the form of a clasp, and that the spring $h$ encircles said shank likewise in a clasp-like manner. The office of the spring $h$ is to aid in restoring the plow-frames to a direct line of draft whenever they may have been forced therefrom by stones, roots, or other obstructions. It will also be observed that while this spring $h$ and the arrangement of clasping a pendent arm by the shank of an outer rail allows an outward swing to the plow-frame, the inner rail, being pivoted only for an upward and downward movement, prevents any swinging movement of the frame inward. This method of construction serves to protect the plants being cultivated from damage by the plows, while at the same time it permits a proper amount of vibratory motion to the frame to enable the operator to avoid small obstructions near the rows.

The letter $n$ represents the draw-bar, which passes through a wrist or sleeve at the bottom of a pendent arm, and is united at its rear end to the bottom of the pivoted arm $m$.

The letter $o$ is a rod connecting the top of arm $m$ with one end of the equalizer $p$.

The devices last mentioned are duplicated upon the other frame D, and in conjunction serve the purpose of applying the draft mainly upon a direct line with the plow-frames, and also to equalize the same.

My plows proper are usually constructed in the shovel form, and are attached to standards in the ordinary manner.

The letter $y$ represents a pulverizer, which consists of a strip of steel or other hardened metal bent in the manner shown, and, being clasped around the plow-standard, is made secure under the plow, or, rather, between the plow and the standard, as represented on the drawings. The office of this pulverizer is to tear the clods and sods asunder and open the ridges formed by the plow. I sometimes construct the plow and the cultivator in one piece. This may be easily done, especially when they are formed by casting in molds or sand.

The letter H represents a supplemental plow and pulverizer attached to a standard, and adapted by the cross-head Z to be operated between the frames D. This cross-head has pins at each end, which may be passed into suitable openings on the inner rails of frames D, and when in place the apparatus becomes a field-cultivator instead of a cultivator for plants merely. Whenever it is desirable to use the machine for cultivating plants, the part H is removed. My mode of attaching the part H is shown on Fig. 4 of the drawings, and to which, for greater certainty, I refer.

Having thus fully described my invention, what I claim as new, and desire to secure by Letters Patent, is—

The spring $h$, connected with the shank of the side rail of the frame D, and the pendent arm of the cross-bar, and in combination therewith, substantially as specified.

In testimony that I claim the above I have hereunto subscribed my name in the presence of two witnesses.

RICHARD B. ROBBINS.

Witnesses:
WILLARD STEARNS,
J. W. HELME.